United States Patent [19]

Bradbury et al.

[11] 4,261,737
[45] Apr. 14, 1981

[54] RECOVERY OF COBALT VALUES

[75] Inventors: James A. Bradbury; Richard T. Um, both of Tucson, Ariz.

[73] Assignee: UOP Inc., Des Plaines, Ill.

[21] Appl. No.: 89,837

[22] Filed: Oct. 31, 1979

[51] Int. Cl.³ .................................................. C22B 23/04
[52] U.S. Cl. ................................ 75/101 BE; 75/103; 75/119; 423/139
[58] Field of Search .................. 75/103, 108, 117, 119, 75/120, 121, 101 BE; 423/139, 24, 25, 54, 100, 112; 210/38 B

[56] References Cited

U.S. PATENT DOCUMENTS

| 1,833,276 | 11/1931 | Busch | 423/25 |
| 3,928,020 | 12/1975 | Weir | 75/119 X |
| 3,970,553 | 7/1976 | Terajima et al. | 423/25 X |
| 4,044,094 | 8/1977 | Barner et al. | 75/119 X |

FOREIGN PATENT DOCUMENTS

| 573814 | 12/1945 | United Kingdom | 75/101 BE |
| 1002413 | 8/1965 | United Kingdom | 75/101 BE |
| 1355535 | 6/1974 | United Kingdom | 75/101 BE |

OTHER PUBLICATIONS

Helfferich, *Ion Exchange*, McGraw-Hill Book Co., 1962, pp. 17 and 18.

*Primary Examiner*—G. Ozaki
*Attorney, Agent, or Firm*—James R. Hoatson, Jr.; Raymond H. Nelson; William H. Page, II

[57] ABSTRACT

The present process involves an improvement in the hydrometallurgical recovery of metal values from metal bearing sources such as ores and the like. The desired metal values are recovered by subjecting a metal bearing source to a reductive roast in a reducing atmosphere after having treated said source with at least one additive. Following the reductive roast the reduced metal bearing source is cooled and extracted by a leaching operation. The separation of various metal values in the metal bearing source may be effected by adding a solid adsorbent to the leach solution whereby selective metal ions are adsorbed thereon. The improvement in the present process comprises pretreating the solid adsorbent prior to use thereof with an acid thereby increasing the loading capacity of the metal ions in the adsorbents as well as kinetics of metal adsorption.

12 Claims, 1 Drawing Figure

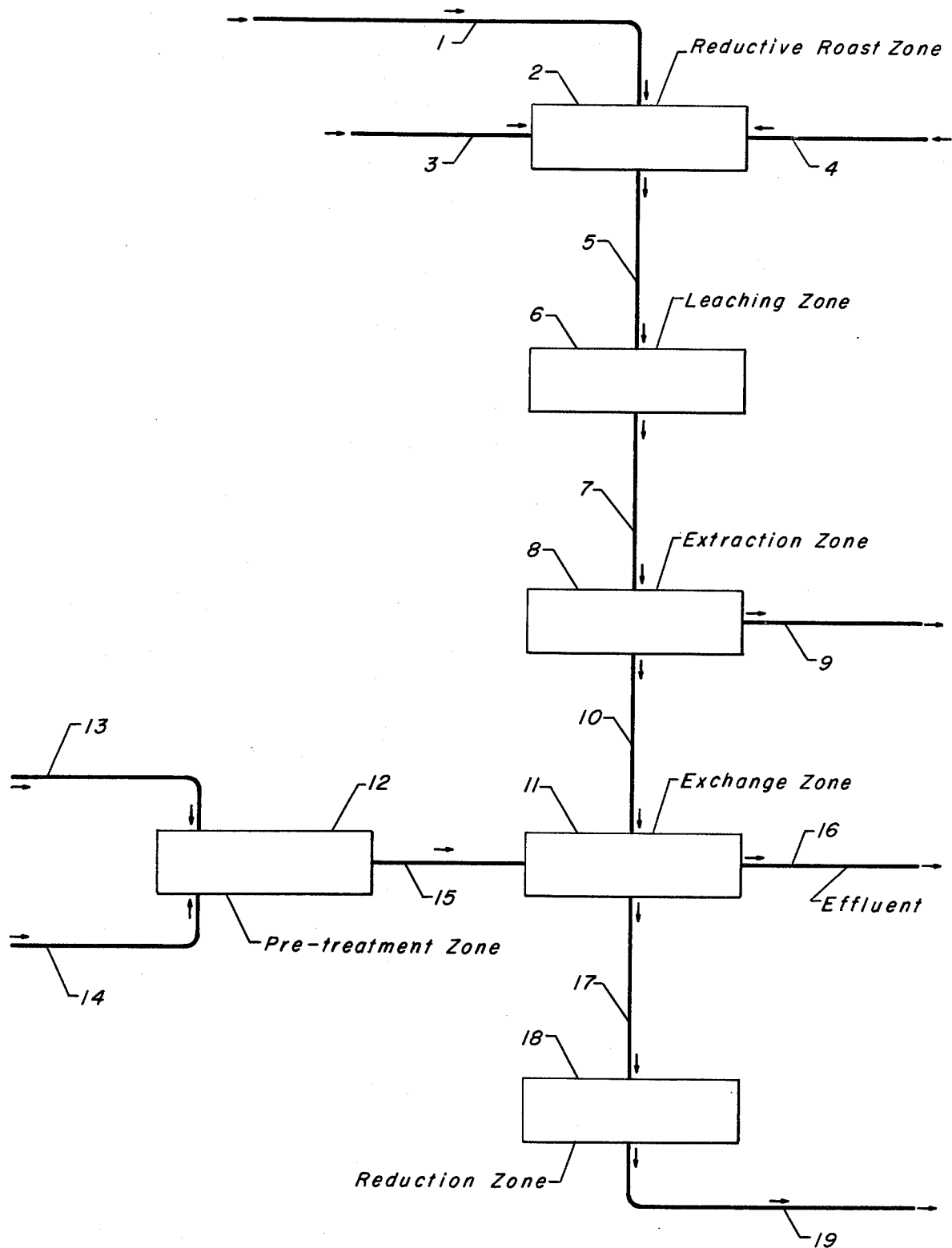

RECOVERY OF COBALT VALUES

BACKGROUND OF THE INVENTION

In the processing of materials containing metal values, two of the main extractive methods to be considered are pyrometallurgy and hydrometallurgy. In the former, a metal containing material such as ore, slag, scrap, etc., is heated with appropriate agents such as reducing agents, fluxing agents, sulfidizing agents, chloridizing agents and/or oxidizing agents, etc., usually to the melting or fusion point of the mixture. At this temperature there is generally a separation of metallic values from gangue or waste materials. The procedure then calls for separating the metallic values from slag or waste material at a temperature at which both are molten. The phase containing the metal value is then cast to some convenient shape for use or for further refining, whichever is appropriate for the particular system involved. The very high temperatures involved in this technique are achieved via electric furnaces, blast furnaces, reverberatory furnaces, etc. Temperatures required for metals such as copper, nickel, iron would generally range from 1000° C. to 2000° C. An advantage in this method is that recoveries of the metal values are typically quite high.

The hydrometallurgy approach differs substantially from pyrometallurgy in that, although the metal bearing material such as ore, slag, scrap, etc., may be heated with agents such as reducing agents, oxidizing agents, sulfidizing and chloridizing agents as part of the procedure, the temperatures involved are generally much lower than with the usual pyrometallurgical method. These temperatures typically may be 260° C. to about 1040° C., temperatures generally well below the fusion point of the metal-containing material.

Following this step, the treated metal-containing material then is contacted with an appropriate aqueous solution for extracting metal values by dissolution. The method is then removed from the solution by precipitation, solvent extraction, evaporation of solvent, etc. The metal-containing residue obtained is then handled appropriately to further refine the metal. Although conditions of temperature are generally much lower than in pyrometallurgy, it is frequently found that recovery of the metal values is also lower than in the pyrometallurgical method.

A particular case where this is true concerns the extraction of nickel from lateritic nickel ores. The pyrometallurgical processes range from the use of an electric furnace for the direct smelting of ore to produce ferronickel through similar techniques involving the blast furnace in which an iron-nickel-sulfide matte is obtained. The extraction of nickel from the ore using this method is greater than 90%.

Of the several hydrometallurgy approaches used commercially for treating this type of ore, the practice on a limonite ore or a highly serpentinic ore, such as that at Nicaro, Cuba, involves roasting the ore in a multihearth furnace while a reducing gas, such as producer gas, passes countercurrent to the ore. Temperatures in this case range from about 485° C. to about 735° C. Following the roasting step, the ore is cooled in the absence of air, mixed with an ammoniacal ammonium carbonate solution and vigorously agitated and aerated. This results in the dissolution of nickel, copper, and cobalt, separating them from the bulk of the ore. This solution then is treated with steam, driving off ammonia and precipitating nickel carbonate. This product then is treated further to obtain the appropriate form of nickel or use as such. In comparison to the pyrometallurgical process, however, extractions using this method have only been of the order of 70 to 80 percent.

Several United States Patents have disclosed processes such as that hereinbefore described. Among these patents are U.S. Pat. Nos. 3,845,189, 3,772,423, 3,772,424 and 3,661,564. These patents describe a hydrometallurgical method utilizing additives comprising aqueous solutions of hydrogen chloride, hydrogen bromide, gaseous sulfur compounds such as hydrogen sulfide, sulfur dioxide, etc., as well as elemental sulfur which are utilized to treat the metal bearing source.

Several other hydrometallurgy methods involve the use of procedures which include a roasting step with chlorides or sulfates but in other than reducing atmospheres and in such a manner as to form soluble metal salts, and the roasted ore is leached with an appropriate solvent such as dilute sulfuric acid. Alternatively, in certain cases the ore can be leached directly, such as with sulfuric acid solution but this is practical only when the magnesia content of the ore is low.

It has now become increasingly important to recover all of the various metals which are present in metal bearing sources such as ores. Although the above set forth patents are concerned primarily with the recovery of nickel, it has become increasingly important that metals such as cobalt be recovered from metal bearing sources such as lateritic ores due to the fact that the use of cobalt is becoming more important in the chemical industry as well as other industries such as metal fabrication, ceramics, etc. The principal use of cobalt is in alloys, especially cobalt steels where it is used for permanent supermagnets as well as cobalt-chromium high speed tool steels. In addition, cobalt alloys are also used where high temperatures are present such as in jet engines. As will hereinafter be set forth in greater detail, it has now been discovered that cobalt may be recovered in greater yields during the hydrometallurgical recovery of other metals such as nickel by utilizing solid adsorbents which have been subjected to a pretreatment prior to their use thereof.

This invention relates to an improvement in the process for the extraction of metal values from metal bearing sources. More specifically, the invention is concerned with an improvement in a hydrometallurgical process for the recovery of metal values from metal bearing sources in which the source has been subjected to a leach utilizing an ammoniacal ammonium salt solution as the leaching medium. For example, one type of leach solution which may be used to effect the process of this invention is that which is obtained by treating a metal bearing source which has been heated in a reducing atmosphere, after having been subjected to treatment with at least one additive, said additives enhancing the effectiveness of the reductive roast whereby the recovery of the desired metal values is improved. The reductive roast is then followed by subjecting the reduced source to contact with the aforesaid ammoniacal ammonium salt solution.

As hereinbefore set forth the hydrometallurgical extraction of metal values has been found to be improved when the reductive roast of the metal bearing source is effected in the presence of additives comprising added halides, added solid sulfur, added sulfur-containing compounds or combinations thereof. While the exact reason for the improved results or the mechanism by which they are accomplished are not known, several explanations therefor may be offered, with the understanding that the applicants do not intend to be limited thereto. One explanation is that the additives may act to reduce or to facilitate reduction of the combined metal or to otherwise assist in liberating the metal, whereby it is readily extractable. Another explanation is that the combination of additives may act or facilitate such action to reduce the metals in an iron metal alloy to thereby convert the metals into a readily extractable form. Still another explanation is that the combination of additives may act to prevent recombination of the metal into a form in which it is less readily extractable.

It is recognized that different ores respond differently to different additives and that greater improvement in the recovery of metal values may be obtained with some ores when the roasting is conducted in contact with a mixture of added gaseous sulfur compound and added sulfur or in contact with added gaseous sulfur compound and added halides or when the roasting is effected in contact with all three of these additives. Also, it is recognized that some added gaseous sulfur compounds will respond differently in this system than other added gaseous sulfur compounds. Accordingly, the specific added gaseous sulfur compound and added sulfur and/or added halide will be selected with reference to the particular ore to be processed.

The process of the present invention may be used for the recovery of metal values from ore slag, scrap, or other metal bearing sources. Examples of metal values which may be recovered in improved yields will include nickel, cobalt, copper, manganese, cadmium, zinc, the platinum group metals, or other metals which are soluble in ammoniacal solutions but not necessarily with equivaent results.

As another advantage to the present invention, the process may be conducted in conventional apparatus and may utilize much of the conventional steps of processes heretofore used. Accordingly, the metal bearing source such as an ore, one example of said ore being a lateritic nickel ore, is prepared in a manner suitable for the process such as finely divided or comminuted particles in a conventional way. The particles may be within a size range of from about 4 mesh to about 500 mesh or smaller and preferably within a range of from about 48 mesh to about 200 mesh. The particles then preferably are dried in a conventional manner to lower the moisture content of from about the usual 25% to 50% down to about 3% or 10% or less. The drying generally is effected in a rotary kiln at conventional temperatures.

The added sulfur compound will be used in a sufficient concentration for the purpose and may be within the range of from about 0.01% to about 10% and preferably from about 0.1% to about 5% by weight of the ore. Any suitable gaseous sulfur compound may be used in the present invention. Preferred gaseous sulfur compounds comprise hydrogen sulfide, sulfur dioxide, sulfur trioxide, carbonyl sulfide, carbon monosulfide, carbon disulfide, etc. For ease of use, the added sulfur compound preferably is normally in gaseous form. In addition, the solid sulfur which may, if so desired, be in solid forms including powder, flour, granules, pellets, etc. Generally speaking, the sulfur is employed in a concentration of from about 0.01% to about 5%, and preferably from about 0.15% to about 3% by weight of the ore. When the additive comprises a hydrogen halide the hydrogen halide is used in a concentration of from about 0.01% to about 10% and preferably from about 0.1 to about 5% by weight of the ore. Any hydrogen halide gas may be used, and preferably comprises hydrogen chloride or hydrogen bromide although it is also contemplated within the scope of this invention that hydrogen iodide or hydrogen fluoride may also be employed but not necessarily with equivalent results. In still another embodiment, a precursor of hydrogen halide may be used and may be selected from free halogen, chlorine, bromine, iodine, fluorine or other suitable compounds selected from metal halides, boron halides, carbon halides, phosphorous halides, silicone halides, etc.

In the preferred embodiment the additives are in gaseous form in order to utilize a dry system for the hydrometallurgical recovery of the metal values. The use of a dry system posesses several advantages of a wet system. For example, a wet system will utilize more costly or expensive equipment and, in addition, will also entail higher operating costs such as that required for fuel. In a wet system, a sufficient amount of heat must be added to remove any moisture which is present in the system. A dry system is non-corrosive in nature as opposed to a potential corrosion problem which may arise when employing wet acids as additives for the process. Other advantages which are found when employing a dry system in the process entails the potential which is present to recover a higher percentage of additives for reuse than is possible when employing a wet system. In addition, another potential which exists is the higher recovery of metal values due to a higher extraction of the desired metal from the metal bearing source.

It is therefore an object of this invention to provide an improved process for the recovery of metal values from a metal bearing source.

A further object of this invention is found in an improvement in a process for effecting the recovery of metal values from a metal bearing source by utilizing a solid adsorbent which has been subjected to pretreatment prior to use thereof.

In one aspect an embodiment of this invention resides in a hydrometallurgical process for the recovery of a metal value from a metal bearing source which comprises leaching the source with an ammoniacal ammonium salt solution, thereafter contacting said solution with a solid adsorbent which has been subjected to pretreatment with an acid to selectively adsorb dissolved metal ions, and recovering the desired metal value.

A specific embodiment of this invention is found in a process for the recovery of metal values from a metal bearing source which comprises subjecting a metal bearing source such as a lateritic ore to a reductive roast in an appropriate reducing atmosphere at a temperature in the range of from about 500° to about 1000° C. in contact with hydrogen chloride, cooling the reduced metal bearing source, dissolving the cooled source with an ammoniacal ammonium carbonate solution, extracting nickel and copper by means of a solvent, adding thereto lignite which has been pretreated with sulfuric acid to adsorb cobalt ions on said lignite, separating lignite from the leach solution and recovering the desired cobalt ions by burning said lignite.

Other objects and embodiments will be found in the following further detailed description of the present invention.

As was hereinbefore set forth the process of the present invention relates to an improvement in the recovery of metal values. As an illustration of one particular method for obtaining the metallic source which is subjected to the recovery process of the present invention, a feed stock which may comprise an ore such as a laterite ore is subjected to a grinding or crushing step in which the feed stock is ground to the desired particle size, said grinding means including a ball mill or any other type of crushing or grinding apparatus which is known in the art. In one embodiment, the feed stock may then be treated with at least one additive selected from the group consisting of hydrogen halides, elemental sulfur, sulfur containing compounds and mixtures thereof. The sulfur containing compound which may be a gaseous sulfur compound such as sulfur dioxide or hydrogen sulfide is used within a sufficient concentration for the purpose and may be within the range of from about 0.01% to about 10% and preferably from about 0.1% to about 5% by weight of the feed stock. For ease of use, the sulfur containing compound is preferably in gaseous form. However, in another embodiment, it may be normally liquid and vaporized prior to use or allowed to vaporize under the conditions existing in the reducing zone. The sulfur containing compound may be a hydrocarbon sulfide including, for example, methyl mercaptan, ethyl mercaptan, propyl mercaptan, butyl mercaptan, pentyl mercaptan, hexyl mercaptan, etc., but generally containing not more than about 20 carbon atoms per molecule. In addition, another additive comprises elemental sulfur. When this additive is employed, the elemental sulfur may be in solid form such as powder, flour, granules, pellets, etc., or as molten or otherwise liquefied sulfur or as sulfur vapors. The elemental sulfur generally is employed in a concentration of from about 0.01% to about 5% and preferably from about 0.15% to about 3% by weight of the ore. If so desired, the gaseous sulfur compound or elemental sulfur may be used in combination with added hydrogen halide. As in the case of the sulfur containing compound, the hydrogen halide is used in a concentration of from about 0.01% to about 10% and preferably from about 0.1% to about 5% by weight of the ore. Any hydrogen halide gas may be used and preferably comprises hydrogen chloride or hydrogen bromide, although hydrogen halide or hydrogen fluoride may be employed, but not necessarily with equivalent results. If so desired, a precursor of hydrogen halide may be utilized and may be selected from free halogens, namely, chlorine, bromine, iodine, or fluorine, or suitable compounds selected from boron halides, carbon halides, phosphorous halides, silicon halides, etc.; or in still another embodiment, the hydrogen halide precursor may comprise a hydrocarbon halide which preferably contains not more than about 20 carbon atoms per molecule. The sulfur compounds and added hydrogen halide may be introduced separately into the reducing zone or they may be supplied in admixture thereto. In one method, the reducing gases are bubbled through a suitable hydrogen halide solution then gaseous sulfur dioxide, hydrogen sulfide or other gaseous sulfur compound added thereto and the reducing gases containing both of the additives are charged to the reducing zone. It is to be understood that any suitable method of introducing these components may be employed, and will be selected to suit the arrangement of the particular system being utilized. When utilizing elemental sulfur, the sulfur may be admixed with the feed stock at an elevated temperature which preferably is within the range of from about 260° to about 450° C. and conveniently is accomplished by mixing the sulfur at the elevated temperature of the particles being withdrawn from a drying step to which the feed stock is subjected at a point subsequent to being ground to the desired particle size and prior to being subjected to the reductive roast.

Thereafter the feed stock is then subjected to a reductive roast, the chemical reduction of the ore being effected by means of an appropriate reducing atmosphere which is of the general type used in conventional processes. Any suitable appropriate reducing gas mixture may be used, and preferably comprises a mixture of hydrogen, carbon monoxide, carbon dioxide, and water vapor. The gas mixture may come from any suitable source including producer gas, gases formed by the combustion of city gas, gases formed by the combustion of oil, coal, etc., the specific gas mixture being selected to effect the desired reduction. An illustrative gas mixture comprises a $CO:CO_2$ ratio within the range of from about 0.1:1 to 10:1, a $O:H_2$ ratio of about 0.1:1 to 10:1 and a $H_2:H_2O$ vapor ratio of about 0.1:1 to 10:1, all being on a volumetric basis. In one embodiment, it is desirable to maintain the gas mixture within the ratios set forth above because an excessive concentration of one or more of the components in the gas mixture may have undesired effects such as, for example, incomplete reduction of the metal compound, excessive adsorption of the gas in the ore particles, etc. It is understood that the gas mixture may contain other components as, for example, nitrogen, when advantages appear therefor. Another illustrative gas mixture comprises hydrogen, nitrogen and water vapor. Still another gas mixture may comprise natural gas or a gas such as carbon monoxide may be employed.

The reduction of the metal compounds to the free metal is effected at a temperature in the range of from about 500° to about 1000° C. and preferably in a range of from about 650° to about 900° C. This temperature which is utilized in the reduction avoids the objections inherently present in the prior art high temperature reduction processes and at the same time is sufficiently high to decompose any soluble metal salts such as metal chlorides present. Also, the reduction is effected in a relatively short period of time and thus further constitutes another advantage to the novel method of the present invention.

In another embodiment of the process, as an alternative method of effecting the addition of additives to the feed stock, the off-gases which are withdrawn from the reducing zone and which contain the additives in the form of halides, halogens, sulfur dioxide or hydrogen sulfide are passed through a scrubbing zone wherein they are scrubbed by contact with a scrubbing material which comprises fresh feed stock, said fresh feed stock being ground metal bearing source. The off-gas is scrubbed in a dry manner at temperatures ranging from about 100° to about 500° C. and preferably in a range of from about 150° to about 400° C. The mixture of fresh feed stock and off-gases after scrubbing thereof are passed to a dust collector wherein the clean off-gases which contain no additives, the additives having been adsorbed or entrained on the feed stock, are separated. The fresh feed stock which contains the volatile additives on the feed or by the reaction of chloridization, adsorption, condensation, neutralization, etc., is also withdrawn from the dust collector and passed to the reducing zone. If so desired, an additional portion of fresh feed stock may be admixed with the treated feed stock prior to admission to the reducing zone and the combined total is then charged to the reducing zone for reaction at the aforesaid temperature of from 600° to 000° C. in a reducing atmosphere.

The reduced ore particles are withdrawn from the reducing zone and thereafter processed in a conventional manner for the hydrometallurgical extraction of the desired metal values. For example, the effluent from the reduction zone is first cooled several hundred degrees and then is passed into one or more quench zones. In a preferred embodiment the quench liquid is the ammonium carbonate leaching solution. However, the quenching must be effected in the absence of air. In other words, oxygen or air should not contact the reduced particles until the temperature of the particles is below about 95° C. because of the possibility of oxidation of the metal to the oxide or to other oxygen-containing compounds. It is understood that other suitable quenching solutions may be employed but, as hereinbefore set forth, economical advantages appear for the use of the leaching solution.

Any suitable leaching solution may be employed and preferably comprises aqueous ammonium carbonate solution containing from about 2% to about 25% and preferably from about 3% to about 15% $NH_3$ and from about 1% to about 15% and preferably from about 1.5% to about 7.5% $CO_2$. As still another advantage to the process of the present invention, the leaching solution comprises a lower concentration of $NH_3$ than generally is utilized in the prior art, thus effecting an additional economy in the present process. The leaching is effected at a temperature below 95° C. and conveniently ambient temperature. Ambient pressure or superatmospheric pressure may be used but generally will not exceed about 100 psig. As hereinbefore set forth, the leaching is effected in the presence of oxygen, which may comprise ambient air when the leaching is effected in open tanks or vessels or it may comprise air introduced into closed zones. It is understood that, in the place of air, oxygen or other suitable oxygen-containing source may be utilized.

While the aforementioned description is indicative of one method of obtaining a leached solution of metals, it is to be understood that any other method known in the art may also be used to obtain the ammoniacal ammonium salt solution which is subjected to the subsequent steps of extraction and exchange.

The solution which is withdrawn from the leaching and thickening zones is then treated in any suitable manner to separate various metal values. For example, when recovering nickel, one method is to steam the solution whereby nickel carbonate is precipitated and the ammonia, carbon dioxide, and water are volatilized. Following this the precipitated nickel carbonate can be treated in any conventional manner to recover the desired metal. In another embodiment the leach solution is subjected to a solvent extraction step utilizing organic solvents such as oximes, specific examples of these solvents being LIX-64, Kelex and Shell Extractant-529. In this extraction the nickel and copper will be separated from cobalt which, due to the fact that the cobalt is in liquid phase in a valence state of +3 will not be extracted.

The aqueous liquid containing the dissolved cobalt will then be passed to an exchange step. In this exchange step the liquid is contacted with a solid adsorbent which has been pretreated with acid prior to its use thereof as an adsorbent. Examples of solid adsorbents which may be utilized will include carbon, coal, lignite, peat, etc., in granular or powder form. The pretreatment of the solid adsorbent to activate the same will be effected by soaking the solid adsorbent in an acid for a period of time which may range from about 0.1 up to about 10 hours or more in duration. The soaking of the solid adsorbent with the acid may be accomplished utilizing a wide range of temperature, said temperatures being in the range of subambient, that is, about 10° C. up to 150° C. or more, the particular temperature which is employed being dependent upon the duration of the residence time, the strength of the acid, and the particular nature of the solid adsorbent. Examples of acids which may be employed to pretreat the solid adsorbent will include both inorganic and organic acids, specific examples of these acids being sulfuric acid, nitric acid, hydrochloric acid, hydrobromic acid, phosphoric acid, etc., organic acids such as formic acid, acetic acid, propionic acid, butyric acid, methanesulfonic acid, toluenesulfonic acid, trichloroacetic acid, trifluoroacetic acid, etc. In addition, the strength of the acid which is employed for the pretreatment of the solid adsorbent will vary over a wide range such as, for example, from about 5 to 100 wt. %.

The contact of the aqueous solution of the metal value such as, for example, cobalt, with the acid treated solid adsorbent will take place, in the preferred embodiment of the invention, at ambient temperature and atmospheric pressure for a period of time which may range from about 0.1 up to about 4 hours or more in duration. Following the contact the solid adsorbent which contains the desired metal value adsorbed thereon may then be subjected to conventional means of metal recovery. For example, the metal ions on the adsorbent may be recovered by stripping the loaded adsorbent with acid and reusing the adsorbent or, if so desired, the adsorbent may be burned to remove the combustible material and recover the metal value in elemental form.

BRIEF DESCRIPTION OF THE DRAWING

The present process will be further illustrated with reference to the accompanying drawing which illustrates a simplified flow diagram of one method of obtaining the feed stock which is subjected to the inventive feature of the present process. Various valves, coolers, condensers, pumps, controllers, etc., have been eliminated as not being essential to the complete understanding of the present invention. The illustration of these, as well as other essential appurtenances will become obvious as the drawing is described.

Referring now to the drawing, a feed stock comprising a metal bearing source such as an ore which has been reduced to the desired particle size is charged through line 1 to reducing zone 2. In reducing zone 2 the source is subjected to a reductive roast at a temperature in the range of from about 600° to about 1000° C. in a reducing atmosphere which is provided for by the introduction of a reductant through line 3. In addition, the metal bearing source is in contact with an additive which may have been added to the metal bearing source prior to its introduction to reductive roast zone 2 or, if so desired, the reductant may be charged to zone 2 through line 4 and the metal bearing source contacted with the additive therein. After being subjected to a reductive roast for a predetermined period of time, the reduced metal bearing source is withdrawn through line 5 and passed to a quench zone, not shown in the drawing, wherein it is cooled to the desired temperature and passed to leaching zone 6. In leaching zone 6, the reduced source is subjected to contact with a leaching solution of the type hereinbefore set forth whereby the various metal values in the metal bearing source are converted to the corresponding soluble salts. After leaching, the solution is withdrawn through line 7 and passed to extraction zone 8 wherein the solution is contacted with a solvent of the type hereinbefore set forth in greater detail. Using a laterite ore as an example of the process of this invention, the nickel and copper contained in the metal bearing source are extracted by the solvent and removed through line 9. Cobalt which is in a valence state of +3 is uneffected by the solvent and is not extracted thereby, remaining in the aqueous phase in the mixture. The unextracted cobalt is withdrawn through line 10 and passed to exchange zone 11. In exchange zone 11 the solution is contacted with a solid adsorbent such as lignite. The lignite has been acid treated in pretreatment zone 12 by contact with an acid of the type hereinbefore set forth which is charged thereto through line 13, the solid adsorbent being charged to pretreatment zone 12 through line 14. After treatment with the acid in zone 12 for a predetermined period of time at the desired treatment temperature the treated solid adsorbent such as lignite is withdrawn from zone 12 through line 15 and passed to exchange zone 11. In exchange zone 11 the metal values such as cobalt ions are adsorbed on the solid adsorbent and after being treated for a desired period of time the effluent or aqueous solution is withdrawn from exchange zone 11 through line 16 and discharged. The solid adsorbent containing the metal ions adsorbed thereon is withdrawn from exchange zone 11 through line 17 and passed to a reducing zone 18. In reduction zone 18 the desired metal values are recovered in a conventional manner such as, for example, by elution of the solid adsorbent whereby the metal ions are recovered in solution or by subjecting the solid adsorbent to combustion at a temperature sufficient to remove the combustible carbon but not sufficient to volatilize the metal. Thereafter the desired metal in either dissolved form or elemental form is removed from reduction zone 18 through line 19 and recovered.

The following examples are given for purposes of illustrating the hydrometallurgical process of this invention. However, it is to be understood that these examples are given merely for purposes of illustration and that the present process is not necessarily limited thereto.

EXAMPLE I

Lignite was ground to a size fraction which ranged from −28 to +48 mesh, said lignite containing 10% by weight of moisture. Following this 3.41 grams of lignite was soaked for 20 minutes in 20 cc of a sulfuric acid solution containing 1000 grams/liter of sulfuric acid. Thereafter 100 cc of a feed solution which contained 52 mg/liter of cobalt, 1 mg/liter of copper, 10 mg/liter of nickel in an ammoniacal ammonium carbonate medium which contained 14.15 grams/liter of ammonia and 31.3 grams/liter of carbon dioxide and which possessed a pH of 9.48 was shaken with 3.41 grams of the pretreated lignite for a period of 30 minutes. The test was repeated three times, once at ambient (70° F.) temperature, once at 100° F. and once at 158° F.

A second series of cobalt extract tests were performed utilizing lignite as the adsorbent which had been pretreated with water alone. Again the feed solution hereinbefore set forth was shaken with the water treated lignite for a period of 30 minutes at ambient temperature, 100° F. and 158° F.

To further illustrate the efficiency of the pretreatment process of the present invention, a lignite adsorbent which had no pretreatment at all but was in the dry stage, was shaken with the feed solution under identical conditions. In all instances after shaking the sample was filtered, the lignite was washed with a given quantity of water and the filtrate was submitted for analysis. The cobalt assays showing the percent of cobalt adsorption on lignite are set forth in Table I below.

TABLE I

| Solution Temp. °F. | Percent Cobalt Adsorption on Lignite | | |
|---|---|---|---|
| | Acid Treated Lignite | Water Treated Lignite | Dry Lignite |
| 70 | 61.5% | 42.3% | 34.6% |
| 100 | 63.5% | 42.3% | — |
| 158 | 65.4% | 50.0% | — |

It is therefore readily ascertainable from the above table that the amount of cobalt which is adsorbed on the solid adsorbent which has been pretreated with an acid solution is dramatically increased over the amount of cobalt adsorbed on lignite which has only been pretreated with water or which has been used in a dry state without any pretreatment.

EXAMPLE II

To illustrate the adsorption kinetics of cobalt loading which may be obtained by a sulfuric acid pretreatment of lignite, a lignite was ground to a mesh size ranging from −28 to +48. Following this 5 grams of the lignite which contained 10% by weight of moisture was pretreated at a temperature of 158° F. with a concentrated sulfuric acid solution containing 1800 grams/liter of sulfuric acid, the pretreatment comprising 20 minutes of soaking the lignite with 20 cc of the solution. A second lignite sample was pretreated in a similar fashion with a second sulfuric acid solution containing 1000 grams/liter of sulfuric acid. The two adsorbents were used to extract cobalt from an ammoniacal ammonium carbonate feed solution which contained 59 mg/liter of cobalt and 32.9 grams/liter of ammonia, the pH of said solution being 9.88. As in the preceding example 100 cc of the feed solution was shaken with 5 grams of the lignite for a period of time ranging from 5 to 25 minutes, samples being taken from the solution at intervals of 5 minutes, 10 minutes, 15 minutes, 20 minutes, and 25 minutes. The filtrate was submitted for analysis with the results set forth in Table II below. In addition, the tests were also repeated using lignite adsorbent which had not been subjected to any pretreatment which was utilized in a dry state.

TABLE II

| Shaking Time, Minutes | Percent Cobalt Adsorption on Lignite | | |
|---|---|---|---|
| | 1800 g/l $H_2SO_4$ Pretreatment | 1000 g/l $H_2SO_4$ Pretreatment | Without Acid Pretreatment |
| 5 | 87% | 54% | 20% |
| 10 | 93% | 68% | 35% |
| 15 | 96% | 76% | 46% |
| 20 | 97% | 81% | 56% |
| 25 | 97% | 83% | 64% |

It is readily apparent from the above table that by utilizing a lignite adsorbent which has been pretreated with sulfuric acid it is possible to attain a cobalt adsorption which will be 50% more than that attained by an untreated lignite at the end of a 5 to 15 minute period.

EXAMPLE III

When the above experiments were repeated using lignite which had been pretreated with hydrochloric acid and nitric acid, it was found that lignite pretreated with a hydrochloric acid solution which contained about 25 wt. % adsorbed about 12 mg of cobalt/gram of lignite in 24 hours. Likewise, lignite which had been pretreated with a nitric acid solution containing about 11 wt. % acid adsorbed about 9.5 mg of cobalt/gram of lignite in 24 hours. This contrasted with untreated lignite which adsorbed only about 5 mg of cobalt/gram of lignite in the same time frame.

We claim as our invention:

1. In a hydrometallurgical process for the recovery of metal values, including cobalt, from a metal bearing source containing cobalt, wherein said source is leached with an ammoniacal ammonium salt solution, and the solution thereafter contacted with a solid carbonaceous adsorbent to selectively adsorb dissolved metal ions, the improvement for increasing the amount of cobalt adsorbed on said adsorbent which comprises treating the solid carbonaceous adsorbent with an acid prior to contacting said solution therewith, and recovering the adsorbed cobalt from the adsorbent.

2. The process as set forth in claim 1 in which said solid adsorbent is carbon.

3. The process as set forth in claim 1 in which said solid adsorbent is peat.

4. The process as set forth in claim 1 in which said solid adsorbent is lignite.

5. The process as set forth in claim 1 in which said acid utilized to pretreat the solid adsorbent is sulfuric acid.

6. The process as set forth in claim 1 in which said acid utilized to pretreat the solid adsorbent is nitric acid.

7. The process as set forth in claim 1 in which said acid utilized to pretreat the solid adsorbent is hydrochloric acid.

8. The process as set forth in claim 1 in which the acid treatment of said solid adsorbent is effected at a temperature in the range of from about 10° to about 150° C.

9. The process as set forth in claim 1 in which said acid utilized to pretreat said solid adsorbent is present in a range of from about 5 to about 100 wt. %.

10. The process as set forth in claim 1 in which said metal bearing source is a laterite ore.

11. The process as set forth in claim 1 in which said metal bearing source contains nickel and copper in addition to cobalt and in that the nickel and copper are separated from said solution by solvent extraction prior to the contacting of the solution with the acid treated carbonaceous adsorbent.

12. The process as set forth in claim 11 in which said solid adsorbent is lignite.

* * * * *